(12) United States Patent
Fakhoury et al.

(10) Patent No.: US 8,469,461 B2
(45) Date of Patent: Jun. 25, 2013

(54) UNIVERSAL WHEEL HUB

(75) Inventors: Omar J. Fakhoury, Vancouver, WA (US); Joseph A. Brotherton, Portland, OR (US); John Schneider, Ridgefield, WA (US)

(73) Assignee: KIC Holdings, Inc., Vancouver, WA (US)

( * ) Notice: Subject to any disclaimer, the term of this patent is extended or adjusted under 35 U.S.C. 154(b) by 246 days.

(21) Appl. No.: 13/030,352

(22) Filed: Feb. 18, 2011

(65) Prior Publication Data

US 2011/0215637 A1    Sep. 8, 2011

Related U.S. Application Data

(60) Provisional application No. 61/310,180, filed on Mar. 3, 2010.

(51) Int. Cl.
 *B60B 27/00* (2006.01)
(52) U.S. Cl.
 USPC .................................. 301/105.1; 301/108.1
(58) Field of Classification Search
 USPC ........... 301/105.1, 108.1, 108.2, 108.3, 108.4
 See application file for complete search history.

(56) References Cited

U.S. PATENT DOCUMENTS

| | | | | |
|---|---|---|---|---|
| 2,535,126 | A * | 12/1950 | Flowers et al. | 70/169 |
| 4,067,621 | A * | 1/1978 | Reppert | 301/108.3 |
| 6,612,657 | B1 * | 9/2003 | Fakhoury et al. | 301/105.1 |
| 6,758,531 | B1 * | 7/2004 | Bullard | 301/37.21 |
| 6,866,345 | B2 * | 3/2005 | Fakhoury et al. | 301/105.1 |
| 7,226,133 | B2 * | 6/2007 | Dombroski et al. | 301/108.1 |
| 7,314,256 | B1 * | 1/2008 | Haines | 301/108.5 |
| 7,547,077 | B2 * | 6/2009 | Melberg et al. | 301/108.1 |
| 2005/0236886 | A1 * | 10/2005 | Hall et al. | 301/105.1 |

* cited by examiner

*Primary Examiner* — Jason Bellinger
*Assistant Examiner* — Jean Charleston
(74) *Attorney, Agent, or Firm* — Marger Johnson & McCollom, P.C.

(57) ABSTRACT

A hybrid wheel hub for trucks is configured to accept interchangeably a threaded screw-on hubcap or a bolt-on hubcap. The hybrid wheel hub comprises a barrel with an axial bore for receiving an axle along a longitudinal axis of the axial bore and a radial flange for attaching a wheel, the barrel having an inboard end and an outboard end including an outboard bearing cup for retaining an outboard bearing assembly within an inner surface of the axial bore. An annular perimeter of the outboard end includes a plurality of bolt holes positioned to receive cap bolts to retain a bolt-on hub cap over the outboard end. A threaded track protrudes radially inward towards the longitudinal axis of the axial bore and is internally threaded circumferentially around the longitudinal axis in position longitudinally to receive a screw-on hub cap having external threads.

8 Claims, 3 Drawing Sheets

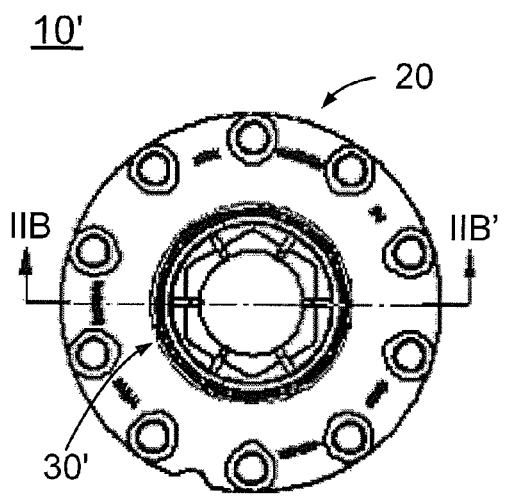
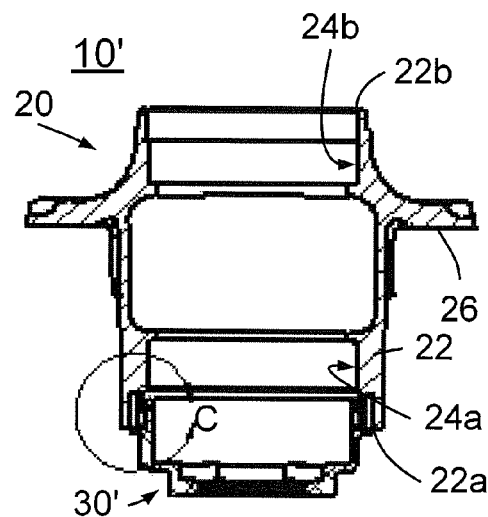
FIG. 2A
FIG. 2B
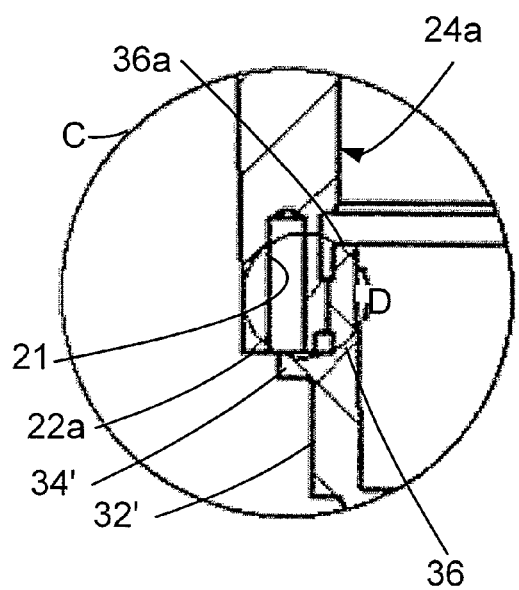
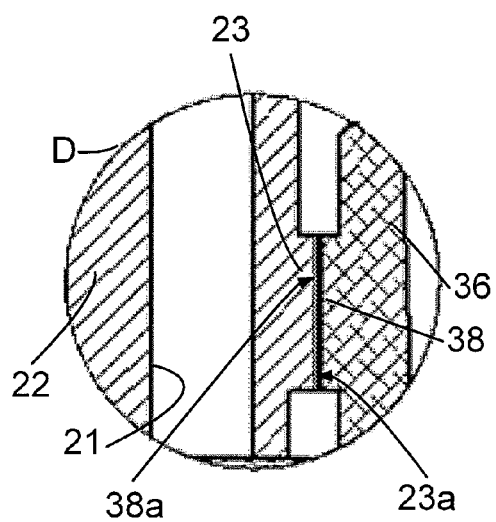
FIG. 2C
FIG. 2D

UNIVERSAL WHEEL HUB

RELATED APPLICATION DATA

This application claims the benefit of U.S. Ser. No. 61/310,180, filed Mar. 3, 2010, herein incorporated by reference.

BACKGROUND

1. Technical Field

This disclosure relates to a wheel hub configured to accept different types of hubcaps. More specifically, this disclosure relates to a hybrid wheel hub (e.g., for large trucks) configured to accept a threaded screw-on hubcap or a bolt-on hubcap. This disclosure also relates to an adaptor configured to allow a bolt-on wheel hub to accept a threaded screw-on hubcap.

2. Description of the Related Art

Generally, a wheel hub has a roughly cylindrical barrel with an axial bore for receiving an axle of a vehicle. The barrel has an outboard end oriented away from the axle and an inboard end oriented toward the axle. The inner surface of the axial bore includes an outer bearing cup for retaining an outboard bearing assembly and an inboard bearing cup for retaining an inboard bearing assembly. The outboard and inboard bearing assemblies support the axle. A hubcap is attached to the wheel hub at the outboard end to secure the outboard bearing assembly within the outboard bearing cup.

Generally, there are two types of hubcaps: bolt-on hubcaps and threaded screw-on hubcaps. Bolt-on hubcaps include a pattern of bolt holes geometrically spaced around the perimeter of the hubcap, and configured to receive cap bolts. Screw-on hubcaps generally include a continuous sidewall that is threaded on its outer surface.

Wheel hubs are conventionally designed to accept one of these hubcap types, but not both. For example, a wheel hub configured to accept a bolt-on hubcap (i.e., a "bolt-on wheel hub") includes a plurality of wheel hub bores or bolt holes symmetrically disposed around the perimeter of the outboard end. A bolt-on hubcap is thus attached to the bolt-on wheel hub by threading cap bolts through the apertures disposed about the perimeter of the hubcap and into corresponding wheel hub bores. An example of a bolt-on wheel hub is shown in FIG. 1 of U.S. Pat. No. 6,866,345 to Fakhoury et al. In a wheel hub configured to accept a threaded screw-on hubcap (i.e., a "screw-on wheel hub"), a portion of the axial bore extending between the outboard end and the outboard bearing cup is internally threaded. A screw-on hubcap is thus attached to the screw-on wheel hub by threadedly engaging the sidewall of the hubcap with the portion of the axial bore. An example of a screw-on wheel hub is shown in FIG. 1 of U.S. Pat. No. 6,758,531 to Bullard.

SUMMARY OF INVENTION

The invention is a hybrid wheel hub for trucks, configured to accept interchangeably a threaded screw-on hubcap or a bolt-on hubcap, and a method for using same. The hybrid wheel hub comprises a barrel with an axial bore for receiving an axle along a longitudinal axis of the axial bore and a radial flange for attaching a wheel, the barrel having an inboard end and an outboard end including an outboard bearing cup for retaining an outboard bearing assembly within an inner surface of the axial bore. An annular perimeter of the outboard end includes a plurality of bolt holes positioned to receive cap bolts to retain a bolt-on hub cap over the outboard end. A threaded track is provided, which protrudes radially inward towards the longitudinal axis of the axial bore and is internally threaded circumferentially around the longitudinal axis in position longitudinally to receive a screw-on hub cap having external threads.

In one embodiment, the threaded track is disposed around the inner surface of the axial bore at a position longitudinally adjacent the annular perimeter and positioned within the outboard end longitudinally between the annular perimeter and the outboard bearing cup.

In another embodiment, the threaded track is formed in an annular adaptor which includes a plurality of bolt holes positioned to receive cap bolts to retain the adaptor in the bolt holes for a bolt-on hub cap over the outboard end.

A threaded screw-on hubcap can then be screwed into the threaded track, or a bolt-on hubcap can be affixed to the same hub via the bolt holes.

The foregoing and other objects, feature and advantages of the invention will become more readily apparent from the following detailed description, which proceeds with reference to the drawings.

BRIEF DESCRIPTION OF THE DRAWINGS

FIG. 2A illustrates a plan view of the wheel hub assembly including a screw-on hubcap attached to the hybrid wheel hub shown in FIG. 1, according to another embodiment of the invention;

FIG. 2B illustrates a section view of the wheel hub assembly shown in FIG. 2A, as viewed along line IIB-IIB' shown in FIG. 2A;

FIG. 2C illustrates an enlarged section view of the wheel hub assembly shown in FIG. 2A corresponding to region C in FIG. 2B;

FIG. 2D illustrates a further enlarged section view of the wheel hub assembly shown in FIG. 2A corresponding to region D in FIG. 2C.

DETAILED DESCRIPTION OF THE EMBODIMENTS

Figure 1:
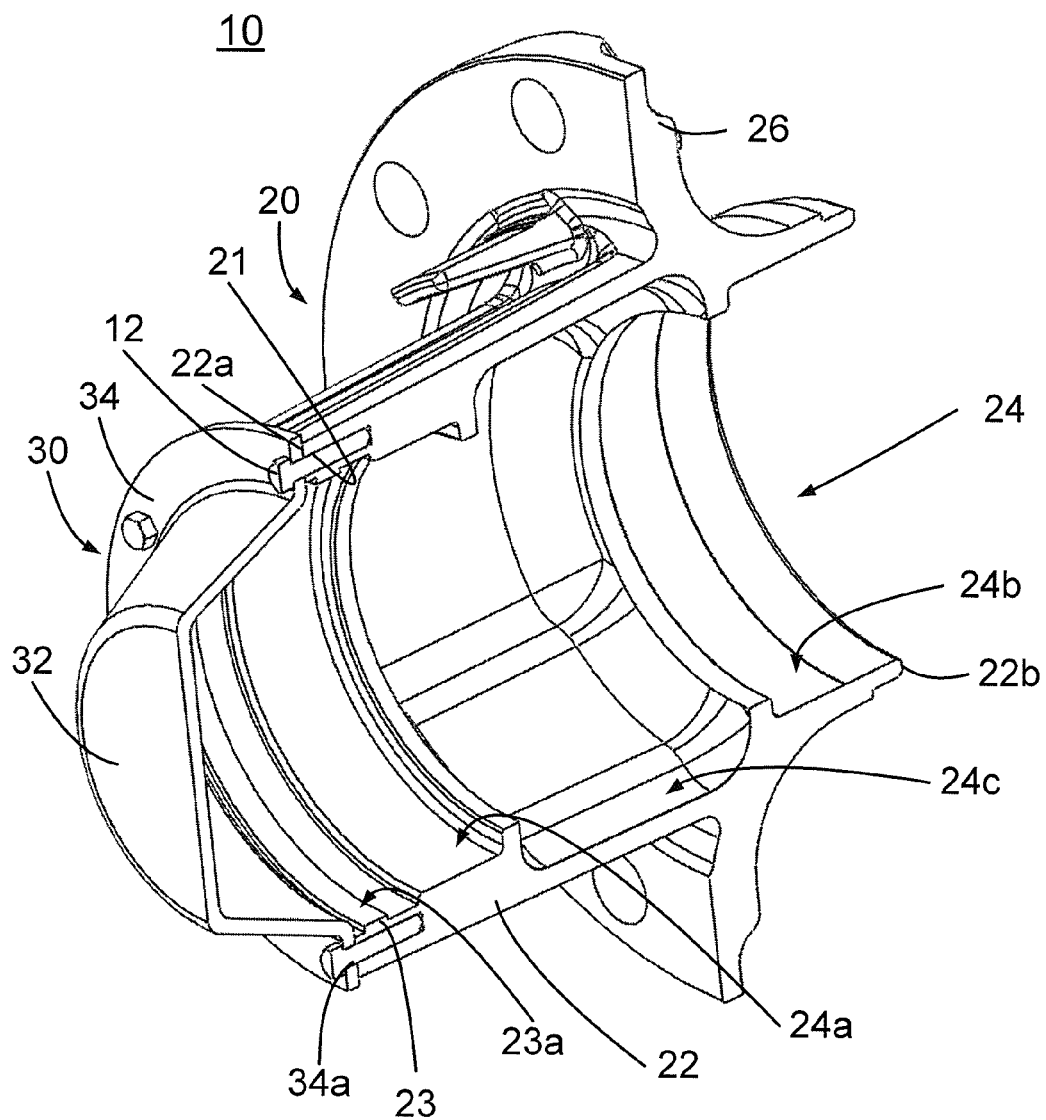
FIG. 1 illustrates a cut-away perspective view of a wheel hub assembly including a bolt-on hubcap attached to a hybrid wheel hub, according to one embodiment of the invention.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a cut-away perspective view of a wheel hub assembly including a bolt-on hubcap attached to a hybrid wheel hub, according to one embodiment of the invention.

Referring to FIG. 1, a wheel hub assembly 10 includes a hybrid wheel hub 20 and a hubcap 30. As illustrated, the hubcap 30 is provided as a bolt-on hubcap attached to the hybrid wheel hub 20 by cap bolts 12.

Generally, the hybrid wheel hub 20 is a cylindrical structure that has a barrel 22 with an axial bore 24 for receiving an axle (not shown) of a vehicle along a longitudinal axis and a radial flange 26 for attaching to a wheel (not shown) of the vehicle. The barrel 22 has an outboard end 22a facing toward the hubcap 30 and an inboard end 22b facing away from the hubcap 30. The main inner surface of the axial bore 24 includes an outboard bearing cup 24a for retaining an outboard bearing assembly (not shown), an inboard bearing cup 24b for retaining an inboard bearing assembly (not shown) and an axle cavity 24c disposed between the outboard bearing cup 24a and the inboard bearing cup 24b.

The hybrid wheel hub 20 further includes a plurality of threaded bores or bolt holes 21 disposed around the annular perimeter of the outboard end 22a. Each of the bores 21 is configured to receive and threadedly engage with a cap bolt 12.

In addition to the bores 21, the outboard end 22a of hybrid wheel hub 20 further includes a threaded track 23 disposed around the main inner surface of the axial bore 24 longitudinally adjacent the perimeter of the outboard end, protruding radially inward towards a longitudinal axis of the axial bore 24 and internally threaded circumferentially around the axial bore. As exemplarily illustrated, the threaded track 23 is spaced apart from the outboard end 22a and the outboard bearing cup 24a. In other embodiments, however, the threaded track 23 may extend to the outboard end 22a and/or to the outboard bearing cup 24a. The threaded track 23 can be integrally formed with the wheel hub 20. As will be discussed in greater detail with respect to FIGS. 2A-2D, the threaded track 23 includes a mating surface 23a that is threaded so that it can threadedly engage with external threads of a screw-on hubcap (see, e.g., FIG. 2B).

The hybrid wheel hub 20 can be provided as a single cast piece, formed of any suitable material such as ductile iron, aluminum, aluminum alloys, magnesium alloys, carbon-fiber composites, or the like.

As illustrated, hubcap 30 is provided as a bolt-on hubcap that includes a body portion 32, an annular flange portion 34 and apertures 34a extending through the flange portion 34. The apertures 34a are arranged at locations that coincide with locations of corresponding bores 21 around the perimeter of the outboard end 22a of the barrel 22. Each aperture 36 is configured to receive a cap bolt 12, which can be inserted into a bore 21.

To attach the bolt-on hubcap 30 to the hybrid wheel hub 20, the hubcap 30 is disposed adjacent to the outboard end 22a of the barrel 22 such that the apertures 34a are aligned with bores 21. Cap bolts 12 are then inserted through apertures 34a of the hubcap 30 and into the bores 21. The cap bolts 12 can be threadedly tightened within the bores 21 to bias the flange portion 34 against the outboard end 22a of the barrel 22. When the hubcap 30 is attached to the hybrid wheel hub 20, the longitudinal axes of the hubcap 30 and the wheel hub 20 are substantially coaxial.

FIG. 2A illustrates a plan view of the wheel hub assembly including a screw-on hubcap attached to the hybrid wheel hub shown in FIG. 1, according to another embodiment of the invention. FIG. 2B illustrates a section view of the wheel hub assembly shown in FIG. 2A, as viewed along line IIB-IIB' shown in FIG. 2A. FIG. 2C illustrates an enlarged section view of the wheel hub assembly shown in FIG. 2A corresponding to region C in FIG. 2B. FIG. 2D illustrates a further enlarged section view of the wheel hub assembly shown in FIG. 2A corresponding to region D in FIG. 2C.

Referring to FIGS. 2A and 2B, a wheel hub assembly 10' includes the hybrid wheel hub 20 described above with respect to FIG. 1, and a screw-on hubcap 30'.

As illustrated, hubcap 30' is provided as a screw-on hubcap that includes a body portion 32', a flange portion 34' and a sidewall portion 36 (e.g., a continuous sidewall) having a threaded track 38 formed on its outer surface, protruding radially outward away from the longitudinal axis of the hubcap 30' and externally threaded. As exemplarily illustrated, the threaded track 38 includes a mating surface 38a that is threaded externally so that it can threadedly engage with the internally threaded mating surface 23a of the hybrid wheel hub 20. As exemplarily illustrated, the threaded track 38 extends longitudinally across only a portion of the sidewall 35 (e.g., so as to be spaced apart from the flange portion 34' and the end 36a of sidewall portion 36. In other embodiments, however, the threaded track 38 may extend to the flange portion 34' and/or to the end 36a of the sidewall portion 36. The threaded track 38 can be integrally formed with the sidewall portion 36.

To attach the screw-on hubcap 30' to the hybrid wheel hub 20, the end 36a of the sidewall portion 36 is inserted into the axial bore 24 of the barrel 22 such that the threaded track 38 of the hubcap 30' is disposed adjacent to the threaded track 23 of the barrel 22. See, e.g., FIGS. 2B and 2C. The hubcap 30' is then rotated relative to the barrel 22 such that the mating surfaces 38a and 23a of the threaded tracks 38 and 23, respectively, threadedly engage with each other. See, e.g., FIG. 2D. The hubcap 30' can be threadedly tightened within the axial bore 24 to bias the flange portion 34' against the outboard end 22a of the barrel 22. See, e.g., FIG. 2C. When the hubcap 30' is attached to the hybrid wheel hub 20, the longitudinal axes of the hubcap 30' and the wheel hub 20 are substantially coaxial.

Figure 3:
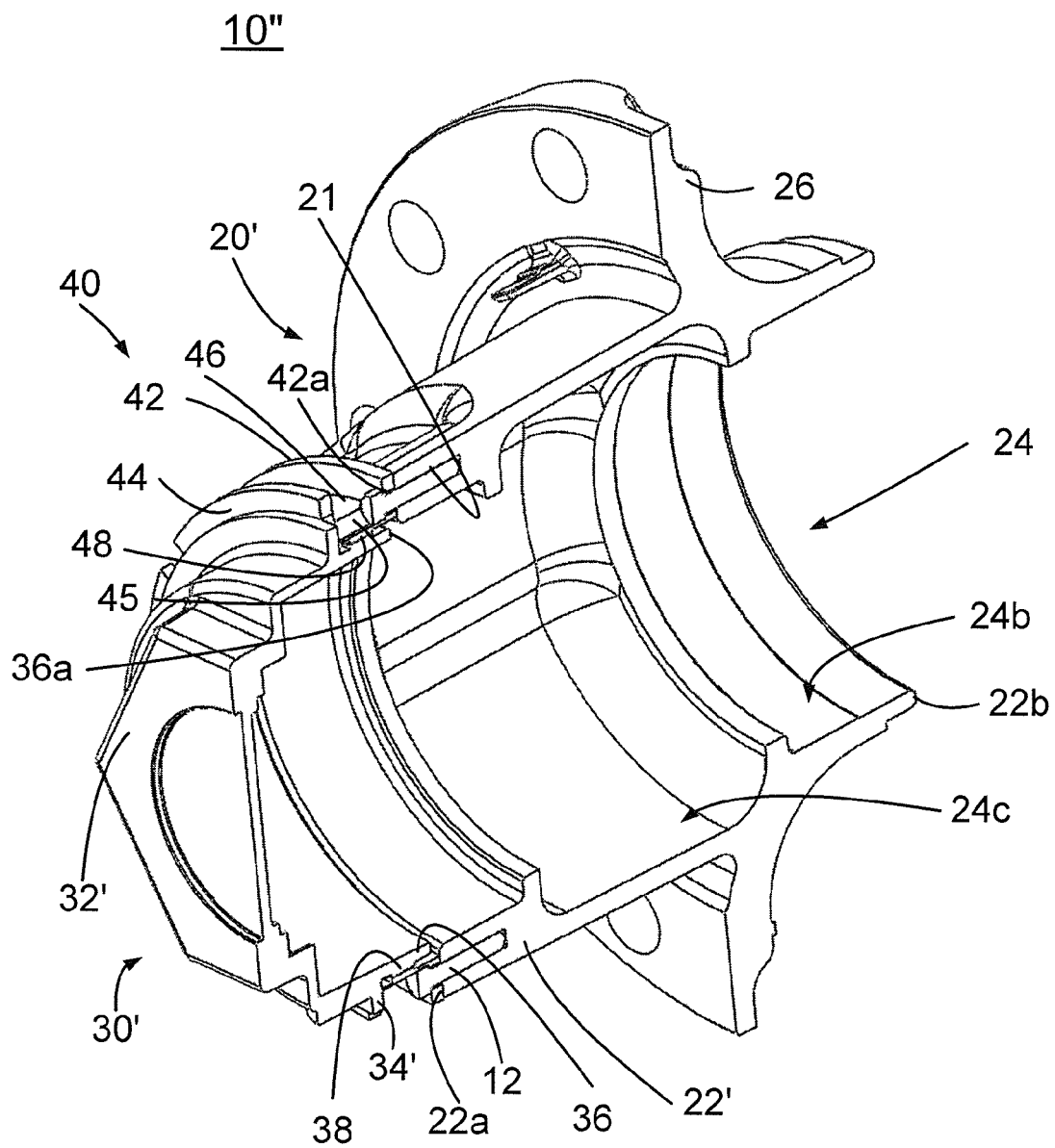
FIG. 3 illustrates a cut-away perspective view of a wheel hub assembly including a hubcap adaptor according to one embodiment of the invention, attached between a bolt-on wheel hub and a screw-on hubcap.

FIG. 3 illustrates a cut-away perspective view of a wheel hub assembly including a hubcap adaptor according to one embodiment of the invention, attached between a bolt-on wheel hub and a screw-on hubcap.

Referring to FIG. 3, a wheel hub assembly 10" includes a bolt-on wheel hub 20', the screw-on hubcap 30' described above with respect to FIGS. 2A-2D and an adaptor 40.

Generally, the bolt-on wheel hub 20' includes a barrel 22' with an axial bore 24 for receiving an axle (not shown) of a vehicle and a radial flange 26 for attaching to a wheel (not shown) of the vehicle. The barrel 22' has an outboard end 22a facing toward the hubcap 30', an inboard end 22b facing away from the hubcap 30'. The inner surface of the axial bore 24 includes an outboard bearing cup 24a for retaining an outboard bearing assembly (not shown), an inboard bearing cup 24b for retaining an inboard bearing assembly (not shown) and an axle cavity 24c disposed between the outboard bearing cup 24a and the inboard bearing cup 24b.

Like the hybrid wheel hub 20, the bolt-on wheel hub 20' includes bores 21 disposed around the perimeter of the outboard end 22a, wherein each of the bores 21 is configured to receive and threadedly engage with a cap bolt 12. However, the bolt-on wheel hub 20' does not include the threaded track 23 described above with respect to FIG. 1. Accordingly, the barrel 22' of the bolt-on wheel hub 20' can be shorter (e.g., by about one inch, as measured between the outboard end 22a and the inboard end 22b) than the barrel 22 of the hybrid wheel hub 20.

The adaptor 40 is generally ring-shaped and includes a first flange portion 42, a second flange portion 44, and sidewall portion 46 extending between the first flange portion 42 and the second flange portion 44. The first flange portion 42 includes apertures 42a arranged at locations that coincide with locations of corresponding bores 21 around the perimeter of the outboard end 22a of the barrel 22. Each aperture 42a is configured to receive a cap bolt 12, which can be inserted into a bore 21 as exemplarily described above with respect to FIG. 1. A groove 45 extends from each aperture 42a within the second flange portion 44 and the sidewall portion 46 and is configured to accommodate a head of a cap bolt 12. In one embodiment, each groove 45 extends radially inward from the outer surfaces of the second flange portion 44 and sidewall portion 46 toward inner surfaces thereof.

The adaptor 40 further includes a threaded track 48 disposed on the inner surface of the sidewall portion 46, protruding radially inward towards a longitudinal axis of the adaptor 40 and internally threaded. The threaded track 48 can be integrally formed with the sidewall portion 46. Similar to the mating surface 23a of the threaded track 23, the threaded track 48 includes a mating surface that is threaded so that it can threadedly engage with external threads of the screw-on hubcap 30'.

The adaptor 40 can be provided as a single cast piece, formed of any suitable material such as ductile iron, aluminum, aluminum alloys, magnesium alloys, carbon-fiber composites, or the like.

To attach the adaptor 40 to the bolt-on wheel hub 20', the adaptor 40 is disposed adjacent to the outboard end 22a of the barrel 22 such that the apertures 42a are aligned with bores 21. Cap bolts 12 are then inserted through grooves 45 defined with the second flange portion 44 and sidewall portion 46, through the apertures 42a of the first flange portion 42, and into the bores 21. The cap bolts 12 can be threadedly tightened within the bores 21 to bias the first flange portion 42 against the outboard end 22a of the barrel 22. When the adaptor 40 is attached to the bolt-on wheel hub 20', the longitudinal axes of the adaptor 40 and the bolt-on wheel hub 20' are substantially coaxial.

In one embodiment, the screw-on hubcap 30' is attached to the adaptor 40 after the adaptor 40 is attached to the wheel hub 20'. Further, the screw-on hubcap 30' can be attached to the adaptor 40 in the same manner as the screw-on hubcap 30' can be attached to hybrid wheel hub 20 as discussed above with respect to FIGS. 2A-2D. For example, the hubcap 30' is brought into proximity with the adaptor 40 such that the threaded track 38 of the hubcap 30' is adjacent to the threaded track 48 of the adaptor 40. Next, the hubcap 30' is rotated relative to the adaptor 40 such that the mating surfaces of the threaded tracks 38 and 48 threadedly engage with each other. The hubcap 30' can be threadedly tightened within the adaptor 40 to bias the flange portion 34' of the hubcap 30' against the second flange portion 44 of the adaptor 40. When the hubcap 30' is attached to the adaptor 40, the longitudinal axes of the hubcap 30', the adaptor 40 and the bolt-on wheel hub 20' are substantially coaxial.

By providing the hybrid wheel hub 20 as exemplarily described above, the same wheel hub can be attached to two different types of existing hubcaps (i.e., bolt-on hubcaps and screw-on hubcaps) without making any modifications to the hubcaps. Thus, a wheel hub assembly can be provided with bolt-on hubcaps or screw-on hubcaps. Further, by providing the adaptor as exemplarily described above, a wheel hub assembly having a bolt-on wheel hub can be provided with a screw-on hubcap without making any modifications to the hubcap. The ability to provide wheel hub assemblies with either bolt-on or screw-on hubcaps gives vehicle operators greater flexibility in maintaining their vehicles, while reducing the maintenance cost over the lifetime of the wheel hub assembly.

The foregoing is illustrative of example embodiments of the invention and is not to be construed as limiting thereof. Although a few example embodiments have been described, those skilled in the art will readily appreciate that many modifications are possible without materially departing from the novel teachings and advantages of the invention.

The invention claimed is:

1. A wheel hub for trucks, configured to accept interchangeably a threaded screw-on hubcap or a bolt-on hubcap, the wheel hub comprising:
    a barrel with an axial bore for receiving an axle along a longitudinal axis of the axial bore and a radial flange for attaching a wheel, the barrel having an inboard end and an outboard end including an outboard bearing cup for retaining an outboard bearing assembly within an inner surface of the axial bore;
    an annular perimeter of the outboard end which includes a plurality of bolt holes positioned to receive cap bolts to retain a bolt-on hub cap over the outboard end; and
    a threaded track protruding radially inward towards the longitudinal axis of the axial bore and internally threaded circumferentially around the longitudinal axis in position longitudinally to receive a screw-on hub cap having external threads.

2. A wheel hub according to claim 1 in which the threaded track is disposed around the inner surface of the axial bore at a position longitudinally adjacent the annular perimeter and positioned within the outboard end longitudinally between the annular perimeter and the outboard bearing cup.

3. A wheel hub according to claim 2 in which the threaded track is formed integrally into the inner surface of the axial bore within the outboard end.

4. A wheel hub according to claim 1 in which the threaded track is positioned longitudinally outboard of the outboard end.

5. A wheel hub according to claim 2 in which the threaded track is formed in an annular adaptor which includes a plurality of bolt holes positioned to receive cap bolts to retain the adaptor in the bolt holes for a bolt-on hub cap over the outboard end.

6. A method for interchangeably affixing a threaded screw-on hubcap or a bolt-on hubcap hub cap to a truck wheel hub, the wheel hub including a barrel with an axial bore for receiving an axle along a longitudinal axis of the axial bore and a radial flange for attaching a wheel, the barrel having an inboard end and an outboard end including an outboard bearing cup for retaining an outboard bearing assembly within an inner surface of the axial bore, the method comprising:

forming in an annular perimeter of the outboard end a plurality of bolt holes in position to receive cap bolts to retain a bolt-on hub cap over the outboard end; and forming a threaded track protruding radially inward towards the longitudinal axis of the axial bore and internally threaded circumferentially around the longitudinal axis in position longitudinally to receive a screw-on hub cap having external threads; and fitting one of a threaded screw-on hubcap and a bolt-on hubcap to the wheel hub.

7. A method according to claim 6 in which the threaded track is formed around the inner surface of the axial bore at a position longitudinally adjacent the annular perimeter and positioned within the outboard end longitudinally between the annular perimeter and the outboard bearing cup.

8. A method according to claim 6 in which the threaded track is formed in an annular adaptor which includes a plurality of bolt holes positioned to correspond to the bolt holes in the outboard end; the adaptor is coupled to the outboard end by cap bolts; and a screw-on hubcap is threaded into the threaded track.

\* \* \* \* \*